Aug. 19, 1924.

A. J. MICHELIN

TIRE ATTACHMENT

Filed Nov. 3, 1923     2 Sheets-Sheet 1

1,505,910

Aug. 19, 1924.
A. J. MICHELIN
TIRE ATTACHMENT
Filed Nov. 3, 1923     2 Sheets-Sheet 2
1,505,910
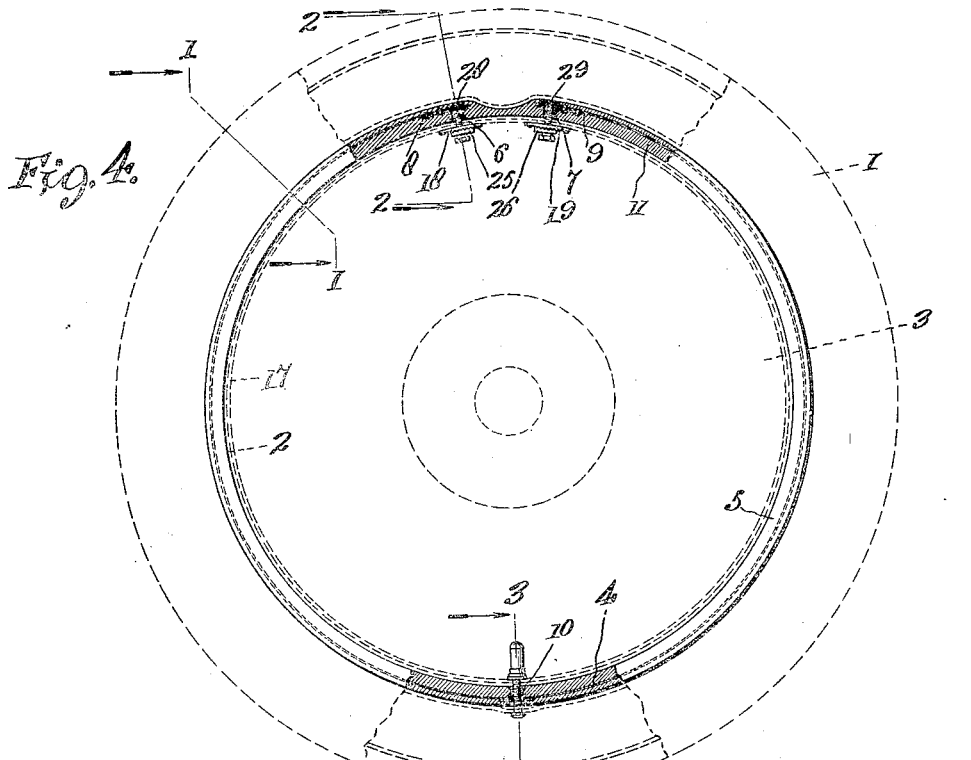
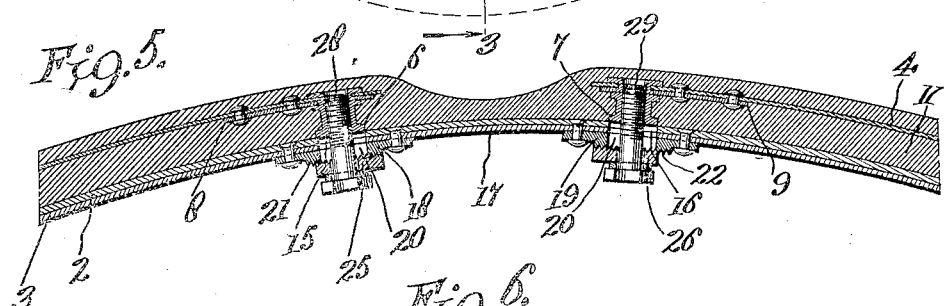
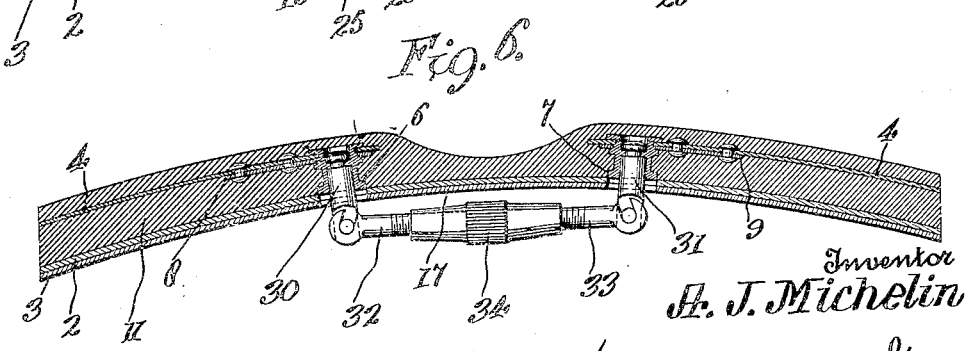
Inventor
A. J. Michelin
by Wilkinson & Giusta
Attorneys.

Patented Aug. 19, 1924.

1,505,910

UNITED STATES PATENT OFFICE.

ANDRÉ JULES MICHELIN, OF CLERMONT-FERRAND, FRANCE.

TIRE ATTACHMENT.

Application filed November 3, 1923. Serial No. 672,545.

*To all whom it may concern:*

Be it known that I, ANDRÉ JULES MICHELIN, a citizen of the French Republic, residing at Clermont-Ferrand, France, have invented certain new and useful Improvements in Tire Attachments; and I do hereby declare the following to be a full, clear, and exact description of the invention, such as will enable others skilled in the art to which it appertains to make and use the same.

The present invention relates to improvements in tire attachments and has for its purpose to securely hold deflated pneumatic tires upon the wheel rims.

When a pneumatic vehicle tire becomes deflated as by a puncture or blow-out, the beads of the casing or shoe are apt to contract or draw together and to escape over the flanges of the wheel rim. Very often the tire becomes wholly detached from the wheel and besides being open to the injurious rim cutting of the tire, the weight of the vehicle and the pounding upon the roadway, particularly where the road surface is rough, deforms the rim flanges so that it is impossible to mount a subsequent tire thereon without first repairing and reforming the rim.

There have been some prior devices intended to prevent the beads of the tire from thus collapsing and escaping from the rim and for holding the tire in its normal position so as to avoid injury to the rim flanges, but all of these devices have proved unsatisfactory in practice for the reason that they become elongated circumferentially and are only held in place by the pressure existing in the inner tube so that when this pressure falls, the device, which is generally in the nature of a ring lying between the two beads of the casing, becomes loose and no longer holds the beads separated; moreover, the loose rings are thrown out by the centrifugal force developed by the turning of the wheel and this further induces collapse of the tire beads.

With other types of fastening rings, great difficulty is experienced in the removal and replacement of the tire and many other practical objections have always prevented devices of this character from being placed in commercial practice.

It is an object of the invention to provide a safety or fastening ring placed between the beads of the tire and being held rigidly in place so as to be unaffected by centrifugal force and not being open to stretching or circumferential elongation; but at the same time being capable of readily slipping over the flanges of the wheel rim in placing and removing the tire.

With the foregoing and other objects in view the invention will be more fully described hereinafter and will be particularly pointed out in the claims appended hereto.

In the drawings, wherein like symbols refer to like or corresponding parts throughout the several views, Fig. 1 is a fragmentary sectional view taken transversely through a wheel rim and tire showing the improved safety ring in place;

Fig. 4 is a side elevation with parts in section showing the improved fastening ring in connection with the tire shown in dotted lines;

Fig. 5 is an enlarged fragmentary circumferential section taken through the safety rings at the fastening devices; and Fig. 6 is a similar view showing a slight modification.

Referring more particularly to the drawings, 1 designates the usual pneumatic tire comprising the outer shoe or casing and the inner tube, both of which are illustrated in a conventional manner and are shown as carried by the wheel 3. At 4 is represented a band of a flexible character and the band extends circumferentially about within the space between the tire beads and conforms substantially to the shape of the tire, said band being a split band and having the extreme ends separated an appreciable distance as indicated at Fig. 5. At these two ends as shown in Fig. 5 are sleeves 6 and 7 which extend radially of the wheel and are threaded interiorly. Small plates 8 and 9 are riveted to the ends of the band 4 to reinforce the same and the sleeves extend through the plates and the band ends, said sleeve being provided with flanges which are offset at opposite sides of the reinforced band.

Figure 1:
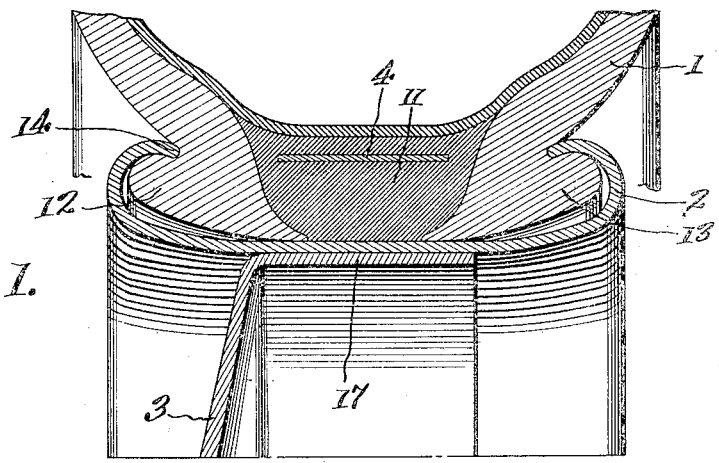
Figure 2:
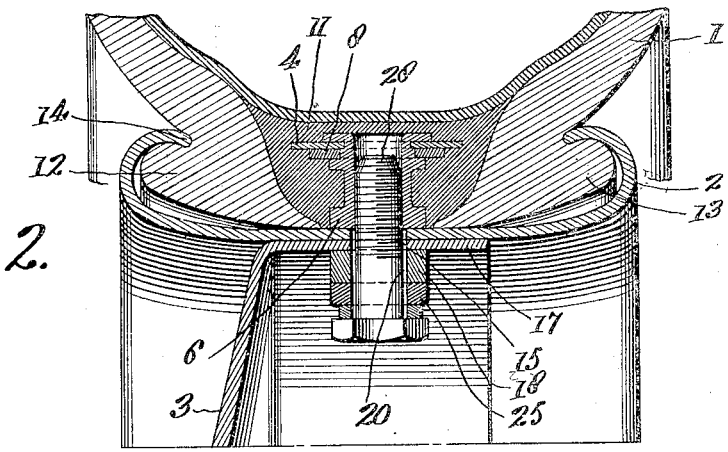
Fig. 2 is a similar view taken through one of the safety ring fastenings.
Figure 3:
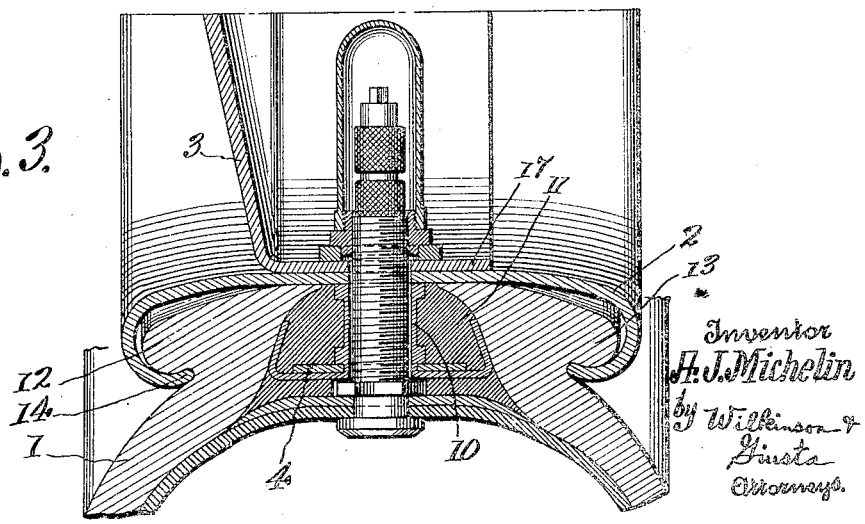
Fig. 3 is also a cross sectional view taken at the point where the valve stem occurs.

At an intermediate point in the band 4 and substantially diametrically opposite the split ends of the band, is a sleeve 10 for receiving the valve stem as shown in Fig. 3.

The metallic band 4 is encased in a body of rubber 11 which is flexible and elastic to a rather high degree and which possesses substantially the cross section shown, or in other words, the body of rubber is adapted to conform closely to the form of the space between the beads of the tire and between the rim and the inner tube.

Now, as before stated the free ends of the band 4 are separated an appreciable distance and the rubber bridges this distance, the cross section of the rubber at the intervening part being reduced in order to permit ease in stretching when placing the safety ring over the flanges of the rim. Now, both the rim 2 and the felly band 17 are provided with oblong openings 15 and 16 opposite the sleeves 6 and 7. Stop lugs 18 and 19 are riveted or otherwise affixed to the inner sides of the felly band 17 about the oblong openings 15 and 16 and similar oblong openings 20 are made in the lugs to register with the openings 15 and 16. Washers 25 and 26 are fitted against the lugs 18 and 19 and the surfaces between the two are roughened or provided with teeth as indicated at 21 and 22. The washers are perforated to fit closely about the shank of the screw bolts 28 and 29 which are threaded into the sleeves 6 and 7.

Fig. 6 shows a slight modification of the device for rigidly attaching the ring in which 30 and 31 are two pins to which are pivoted the rods 32 and 33 having reversed threads and engaged by the opposite sides of the actuating nut 34. By turning this nut in the one direction the ends of the ring will be separated and by reversing the direction the ends will be drawn together or contracted. The force is applied substantially tangentially and is very effective for this reason.

In use of this device the safety ring, built up of the band 4 and the rubber body 5, is placed between the beads 12 and 13 of the pneumatic tire and both the beads and the safety ring stretched over the flanges 14 of the rim 2 by the use of usual tools employed for this purpose. The intermediate reduced section of the rubber body between the split ends of the steel band will stretch and the device may therefore readily be put in place, contracting after the same is put upon the rim owing to the inherent elasticity in the rubber body. Of course, the valve stem is initially placed in the casing 10 and when placing the tire on the rim the valve stem is engaged through the usual opening provided for this purpose. The valve stem acts to center the device and to bring the sleeves 6 and 7 opposite to the stop lugs. In order to compensate for irregularities in the dimensions of rims, the fastening bolts 28 and 29 may be adjusted circumferentially in the oblong slots of the rim and the lugs and after being tightened, the notched or toothed character of the washers in conjunction with the lugs will serve to hold the band 4 in place and prevent its local buckling, distortion or stretching. The ring is therefore held in a tight contracted position from end to end and on deflation of the tire, this band will hold the safety ring in place without regard to the pressure developed on the safety ring by the pneumatic tube. Of course this pneumatic tube pressure will assist to hold the ring in place.

In mounting, the safety ring is inserted in the casing at the same time as the air tube, the valve being placed in the sleeve 10 as heretofore stated. The entire assemblage (casing, air or inner tube and safety ring) is then mounted on the rim by the usual method of mounting these tires.

Removal is likewise carried out in the usual manner. After having withdrawn the locking bolts 28 and 29 and the washers 25 and 26, the lever for removing the casing beads from the rim flanges is introduced at a point diametrically opposite the valve, that is opposite the elastic part of the ring between the split and separated ends of the metallic band.

The material of which the band 4 is made is not especially important except that the band should be substantially non-stretching and steel is found excellent for this purpose. The encasing body 11 may also be of other material than rubber but the rubber is found to encase the steel band and to protect other parts from the cutting by the band and the rubber is also easily stretched when putting the device in place. The entire safety ring will normally be slightly smaller than the diameter of the rim in order to place it under tension when on the rim without regard to the pressure of the inner tube or other external forces, as this tensioned condition of the safety ring will insure its tightness and the binding of the tire beads at all times even should the fastenings become loose. The ring contracts circumferentially from its intermediate part as this is fixed to the rim by the presence of the valve stem. In other words the ring contracts in opposite directions from the valve stem to the free ends of the split band and this action takes place until the friction between the ring and the beads becomes sufficient to resist the sliding of the device. For the purpose of permitting of this gripping or free movement of the rubber body 5 at the sides of the beads, the band 4 is less in width than the distance between the beads or in other words a free space is provided for local movement of the rubber body at the sides of the ring and adjacent the tire beads.

Although the drawings show the invention as applied to a clincher type of rim, it will be understood that the improvement is equally applicable to straight-sided rims. When a straight-sided pneumatic tire is deflated by reason of a puncture or blow-out, the tire beads, no longer being held applied by the pressure of the air tube against the sides of the rim, tend to approach each other toward the center of the rim; the result is that the side ring leaves is seat and the casing becomes detached from the wheel. In the case of the clincher tire, the beads spread out flat during travel and slip over the edges of the rim.

It is understood that changes in form, proportion, size and minor details may be made within the scope of the claims without departing from the spirit or sacrificing any of the advantages of the present invention.

What is claimed is:—

1. A safety ring for the purpose described comprising a substantially inextensible split band having its free ends spaced apart, a body of extensible material extending about said band and between the free ends thereof whereby to permit stretching of the band to secure the same on a clincher rim, and means for holding the band to the rim.

2. A safety ring for tires comprising a flexible and substantially inextensible band having its free ends separated, a body of highly flexible rubber molded about said band and in the space between the free ends of said band whereby to permit stretching of the ring over the flange of a wheel rim, and fastening devices for securing the band to the wheel rim at substantially the free ends of said band.

3. A safety ring for holding the beads of vehicle tires upon rims comprising a metallic flexible but inextensible band having its free ends separated and adapted to extend about within the space between the beads of the tire and between the inner tube and the rim, a body of highly flexible rubber enveloping said band and formed substantially to the shape of the space between said beads of the tire and the inner tube and the rim, the band being less in width than the distance between the tire beads, said body of rubber extending across the space between the free ends of the ring and being of reduced section at this point, and means for adjustably and rigidly securing the free ends of the band to the rim.

4. A safety ring for holding the beads of pneumatic tires upon rims comprising a body of elastic and flexible material adapted to substantially fill the space between the tire beads and between the inner tube and the rim in the inflated normal condition of the tire, said body being continuous and of a diameter normally less than the diameter of the rim whereby to hold the body in a condition of tension while on said rim, an inextensible band molded within said body and having its free ends separated within the body, the intermediate part of said band being rigidly associated with the valve stem, the ring adapted to contract from the center in opposite directions toward its free ends, said band being of substantially less width than the cross sectional width of the body whereby to leave an appreciable depth of the body for local movement at the sides of the ring, and means for fastening the free ends of the ring to the rim and to the wheel.

5. A safety ring for holding the beads of pneumatic tires upon vehicle rims comprising an inextensible split band having its intermediate part rigidly associated with the valve stem, a body of rubber enveloping said band and extending across the space at the free ends thereof, said ring being normally of slightly smaller diameter than the rim, and adapted to substantially fill the space between the tire beads and between the inner tube and the rim, and means for drawing the free ends of the band together and moving the same apart.

6. In combination with a vehicle wheel having a felly band, a flanged rim thereon, and a vehicle tire comprising a shoe having beads for extending within the flanges of the rim and an inner tube in said shoe, of a flexible and resilient body adapted to be placed between the beads of the tire and between the inner tube and the rim, an inextensible band enveloped by said body and having its ends apart, the intermediate part of the band being associated with the valve stem, sleeves extending substantially radially from the free ends of the band, fastening means passing through the felly band and the rim for entering and engaging with said sleeves, and means for securing said fastening means in adjusted circumferential position.

7. In combination with a felly band, a rim thereon, said felly band and rim having pairs of registering circumferentially elongated slots, toothed lugs secured about said slots and having similar slots therein, toothed washers associated with said lugs, bolts passing through said washers, a rubber body extending about centrally of the rim, threaded sleeves mounted in said body for receiving said bolts, and a band also mounted in said body and having reinforced spaced apart ends secured to said sleeves.

ANDRÉ JULES MICHELIN.